United States Patent
Abbott et al.

(10) Patent No.: US 6,763,570 B2
(45) Date of Patent: Jul. 20, 2004

(54) METHOD OF CLOSING A PRESSURE VESSEL

(75) Inventors: Stephan L. Abbott, Monroeville, PA (US); Louis J. Tylman, Acme, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 10/306,809

(22) Filed: Nov. 27, 2002

(65) Prior Publication Data

US 2003/0135975 A1 Jul. 24, 2003

Related U.S. Application Data

(60) Provisional application No. 60/339,967, filed on Nov. 30, 2001, and provisional application No. 60/399,779, filed on Jul. 29, 2002.

(51) Int. Cl.[7] .............................................. B23P 17/00
(52) U.S. Cl. ................... 29/525.01; 29/723; 29/890.03; 81/57.38
(58) Field of Search ......................... 29/525.01, 525.02, 29/452, 890.03, 888.3, 402.02, 428, 723; 81/57.38; 376/285, 205; 254/93 A; 292/327

(56) References Cited

U.S. PATENT DOCUMENTS

| | | | | |
|---|---|---|---|---|
| 3,722,332 A | * | 3/1973 | Jones ........................ | 81/57.38 |
| 3,830,536 A | * | 8/1974 | Frisch et al. ........... | 292/256.73 |
| 3,847,041 A | * | 11/1974 | Meschonat et al. ........ | 81/57.38 |
| 3,851,906 A | | 12/1974 | Frisch et al. | |
| 3,877,326 A | * | 4/1975 | Kock et al. ................ | 81/57.38 |
| 4,047,456 A | * | 9/1977 | Scholz ....................... | 81/57.38 |
| 4,223,575 A | | 9/1980 | Krueger | |
| 4,786,461 A | * | 11/1988 | Veronesi et al. ............ | 376/285 |
| 4,854,798 A | | 8/1989 | Snyder et al. | |
| 5,046,906 A | | 9/1991 | Bucknell | |
| 5,527,015 A | | 6/1996 | Percival-Smith | |
| 5,730,569 A | | 3/1998 | Bucknell | |
| 6,167,764 B1 | | 1/2001 | Calhoun | |

FOREIGN PATENT DOCUMENTS

| | | |
|---|---|---|
| GB | 2245681 A | 1/1992 |
| WO | PCT/US89/03109 | 2/1991 |
| WO | PCT/AU97/00425 | 1/1998 |
| WO | PCT/AU00/00138 | 9/2000 |

* cited by examiner

*Primary Examiner*—I Cuda Rosenbaun
*Assistant Examiner*—Stephen Kenny

(57) ABSTRACT

A pressure vessel having a removable closure head in a high radiation environment is closed by placing the closure head having a flange over and spaced from the flange of a pressure vessel body containing fissile material. The closure studs are installed in closure stud holes of the pressure vessel body flange. Transition nut members of hydraulic nut assemblies are threaded onto the closure studs. Hydraulic hoses are connected between the hydraulic nut assemblies and a pressure source. The pressure source simultaneously pressurizes the hydraulic nut assemblies to simultaneously apply a uniform force to the closure studs sufficient to seat the spaced apart closure head flange on the pressure vessel body flange and to elongate the closure studs. The hydraulic nut assemblies are locked in place over the closure head flange while the force is applied to the closure studs and the closure studs are elongated. The hydraulic pressure on the hydraulic nut assemblies is released while the hydraulic nut assemblies are locked in place over the closure head flange and the closure studs are elongated. The hydraulic nut assemblies may remain connected with the hydraulic hoses after the pressure vessel has been returned to on-line operations and is generating thermal power. The hydraulic hoses connected with the hydraulic nut assemblies may be vented while generating thermal power in the pressure vessel.

13 Claims, 4 Drawing Sheets

METHOD OF CLOSING A PRESSURE VESSEL

CROSS REFERENCE

This application for patent claims priority from Provisional Patent Application Nos. 60/339,967 filed Nov. 30, 2001 and 60/399,779 filed Jul. 29, 2002.

BACKGROUND OF THE INVENTION

The invention relates to a method of closing a pressure vessel and more particularly to a method of closing a pressure vessel containing radioactive materials.

Commercial nuclear power plants are presently operated for up to twelve to eighteen months or more to generate electrical power and then are taken off-line on scheduled inspection, maintenance and/or refueling outages. In the course of routine refueling outages, about a third of the spent fuel assemblies in the cores of nuclear reactor pressure vessels may need to be replaced with fresh fuel assemblies and the other fuel assemblies may need to be repositioned in the cores. In the course of other outages, the fuel assemblies may remain in the core but must be exposed. The fuel assemblies contain enriched uranium and perhaps other fissile materials. Thus, personnel working around the pressure vessels must be protected from excessive radiation exposure. Each step of an outage, whether or not on a critical path schedule, must be performed as rapidly and as safely as possible in order to maintain a short outage time.

After a pressure vessel has been inspected, serviced or refueled, the pressure vessel must be closed so that the plant can return to on-line power generation operations. Outage schedules generally allocate at least about ten hours or more and require five or more workers to move bulky, heavy stud tensioning equipment into the high radiation environments surrounding the nuclear reactor pressure vessels in reactor buildings, manipulate the equipment around the pressure vessel flanges to tension the closure stud nuts mounted on closure studs holding reactor pressure vessel heads to reactor pressure vessel bodies, and then remove the tensioning equipment from the reactor buildings. The tensioning step in commercial plants (which typically involves the simultaneous use of several multi-stud tensioners) requires two hours or more and may expend up to 500 millirem or more of radiation. See, in this regard, U.S. Pat. Nos. 3,851,906; 4,223,575 and 6,167,764, which generally disclose the types of tensioners and turn out tools and methods used in the nuclear power industry to close reactor pressure vessels in order to access the fuel assemblies in their core regions.

SUMMARY OF THE INVENTION

It is an object of the present invention to provide a method for closing pressure vessels in radioactive environments more rapidly than is possible using the equipment and current best practices of the nuclear power industry. It is a further object to provide a method for closing the pressure vessels with reduced personnel radiation exposure.

With these objects in view, the present invention resides in a method of closing a pressure vessel, comprising the steps of: placing a closure head having a flange over and spaced from a flange of a pressure vessel body containing radioactive fuel assemblies; installing threaded closure studs in closure stud holes of the pressure vessel body flange; attaching hydraulic nut assemblies to the closure studs; connecting hydraulic hoses between the hydraulic nut assemblies and a pressure source; simultaneously pressurizing the hydraulic nut assemblies from the pressure source to simultaneously apply a force to the closure studs sufficient to seat the spaced apart closure head flange on the pressure vessel body flange and to elongate the closure studs; locking the hydraulic nut assemblies in place over the closure head flange while the force is applied to the closure studs and the closure studs are elongated; and then releasing the hydraulic pressure on the hydraulic nut assemblies while the hydraulic nut assemblies are locked in place over the closure head flange and the closure studs are elongated.

In a preferred practice, where the pressure vessel contains a removable upper core support assembly supported by springs on the fuel assemblies, the step of placing the closure head over and spaced from the pressure vessel body flange includes supporting the closure head on the upper core support assembly spring supported by the fuel assemblies.

In another preferred practice, the closure studs are installed while the closure head flange is over and spaced from the pressure vessel body flange. In this practice, the hydraulic nut assemblies or structural members of the assemblies may be attached to the closure studs before the closure studs are installed.

BRIEF DESCRIPTION OF THE DRAWINGS

The invention as set forth in the claims will become more apparent from the following detailed description of preferred practices thereof and structure shown, by way of example only, in the accompanying drawings, wherein:

DESCRIPTION OF PREFERRED PRACTICES

Figure 1:
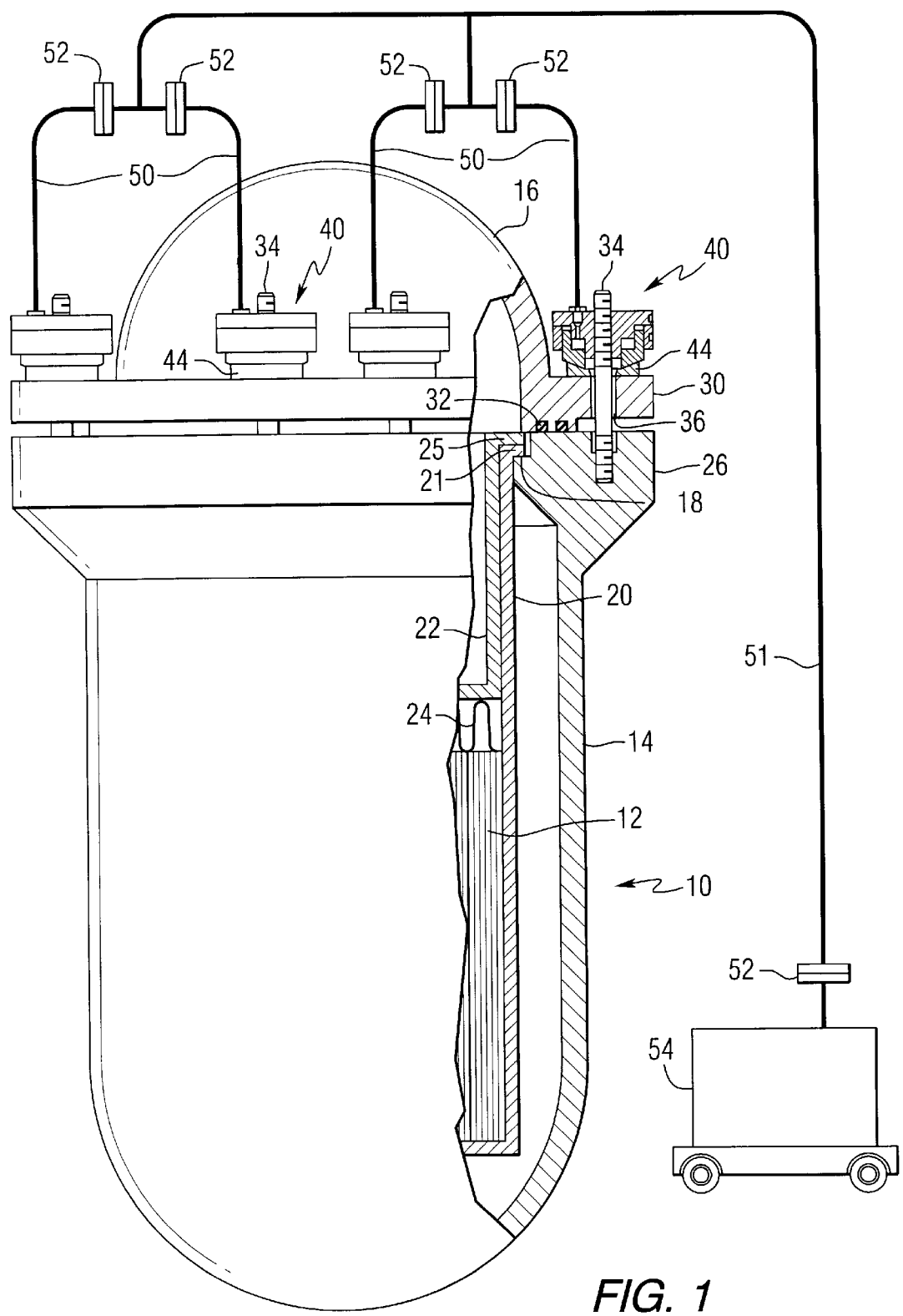
FIG. 1 illustrates a pressure vessel which may be closed in the practice of the present invention, with the pressure vessel having a partially broken away portion generally showing a hydraulic nut assembly attached to a closure stud and hydraulically connected with a pressure source.

The present invention was designed to rapidly and safely close reactor pressure vessels disposed in pressurized water reactor plants for generating commercial electric power during on-line operations. Thus, FIG. 1 generally illustrates a pressure vessel 10 containing nuclear fuel assemblies 12 in a pressurized water nuclear reactor plant, which vessel is in the process of being closed in accordance with a preferred practice of the present invention in the course of an outage. Fuel assemblies in pressure vessels in commercial pressurized water nuclear reactor plants may hold up to 50,000 or more small diameter tubes filled with enriched uranium pellets or other fissile materials. See, in this regard, U.S. Pat. No. 5,303,276 for a general discussion of fuel assemblies and their structures. Commercial pressure vessels are designed to continuously operate in radioactive environments at pressures of up to 2250 psi or more and at temperatures of up to 600° F. or more. However, in the course of an outage, the temperature of the pressure vessel 10 will be reduced to about 150° F. or lower and the pressure vessel 10 will be open to the general atmosphere. The present invention may also be used to close pressure vessels containing fuel assemblies in boiling water nuclear reactor plants and high temperature gas reactor plants.

The pressure vessel 10 generally has a body 14 and a removable closure head 16. The closure head 16 is removed from the pressure vessel body 14 at the beginning of an outage to access the core region of the pressure vessel 10 containing the radioactive fuel assemblies 12 and then reseated at the end of an outage before initiating on-line electrical power generation operations. The body 14 has an internal support ledge 18 that supports a flange 21 of a core barrel 20, which in turn supports the fuel assemblies 12. An upper core support assembly 22 (comprising an upper core support plate, support columns and a top support plate) floats on springs 24 mounted on the fuel assemblies 12. The upper core support assembly 22 has a flange 25 extending horizontally between the closure head 16 and the internal support ledge 18 but is not otherwise fixedly attached to the pressure vessel body 14. Springs (not shown) may be disposed between the core barrel flange 21 and the upper core support plate flange 25, as shown in U.S. Pat. No. 5,325,407. The upper core support assembly 22 supports the fuel assemblies 12 against upward hydraulic forces during on-line power generation operations and is removed at the beginning of an outage to access the core region of the pressure vessel 10.

The pressure vessel body 14 has a peripheral flange 26 that extends outwardly of the internal support ledge 18. The removable closure head 16 has a peripheral flange 30 designed to seat on the flange 26 of the pressure vessel body 14. A pair of concentric O-rings 32 is disposed in the lower surface of the closure head flange 30 for sealing the pressure vessel 10 during on-line electrical power generation operations. A plurality of threaded closure studs 34 extend upwardly from the pressure vessel body flange 26 through stud holes 36 in the closure head flange 30. Some pressure vessels (not shown) employ special closure studs having upper ends with buttress type splines rather than threads for operation with quick acting tensioning equipment. The pressure vessels of commercial electricity generating plants may be up to thirteen feet in diameter or larger and have up to forty-eight closure studs or more. The closure studs 34 may be up to six inches in diameter or larger and up to twelve inches in length or longer. Also, the closure studs 34 may have a manganese phosphate coating or a plasma or ion bonded plating on the threads to resist galling. The closure studs 34 may be removed from the pressure vessel flange 26 in some outage practices and permitted to remain in place in other outage practices. In addition, some closure studs 34 may be removed and other closure studs 34 permitted to remain in place in other practices.

Figure 2:
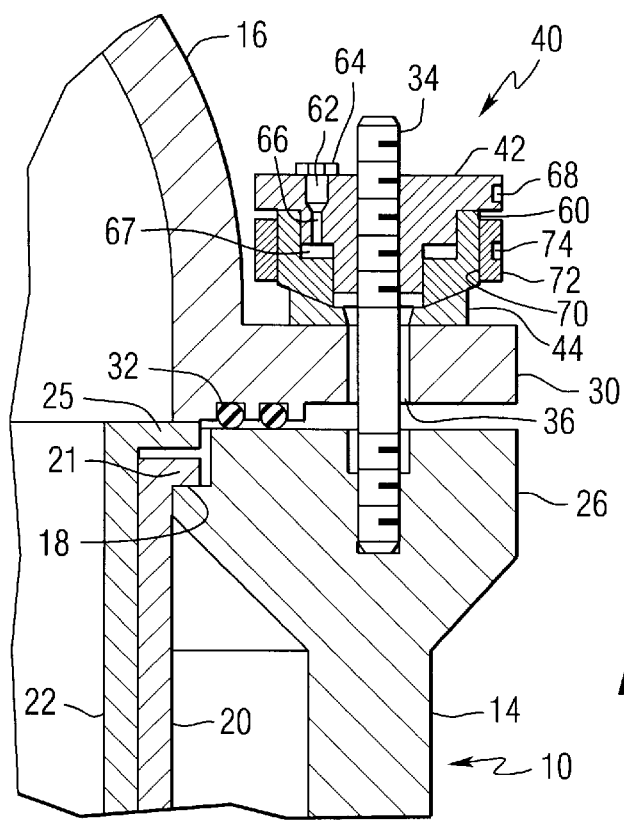
FIG. 2 is an enlarged illustration of a portion of the pressure vessel and the hydraulic nut assembly of FIG. 1 before significant hydraulic pressure has been applied to the hydraulic nut assembly.
Figure 3:
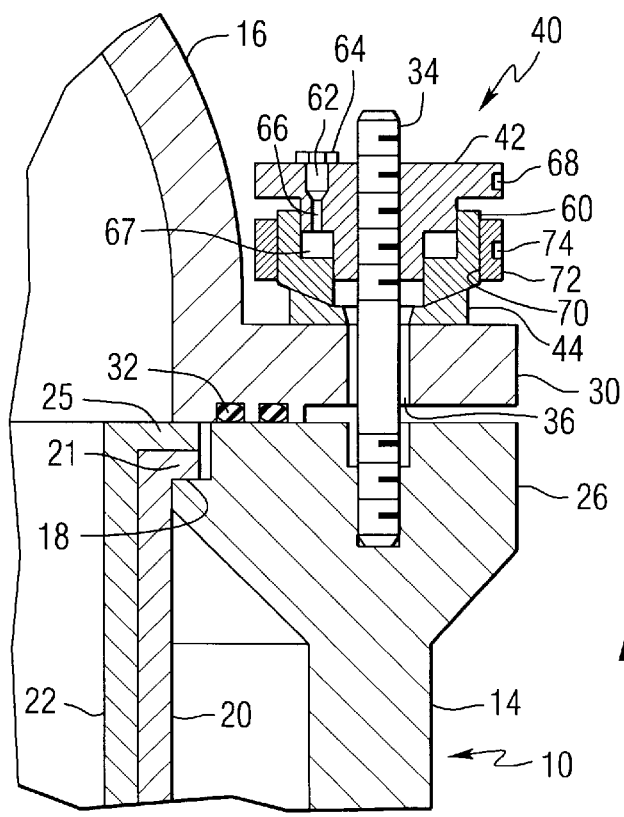
FIG. 3 is an enlarged illustration of a portion of the pressure vessel and the hydraulic nut assembly of FIG. 1 after sufficient hydraulic pressure has been applied to the hydraulic nut assembly to seat the removable pressure vessel closure head and to elongate the closure stud.
Figure 4:
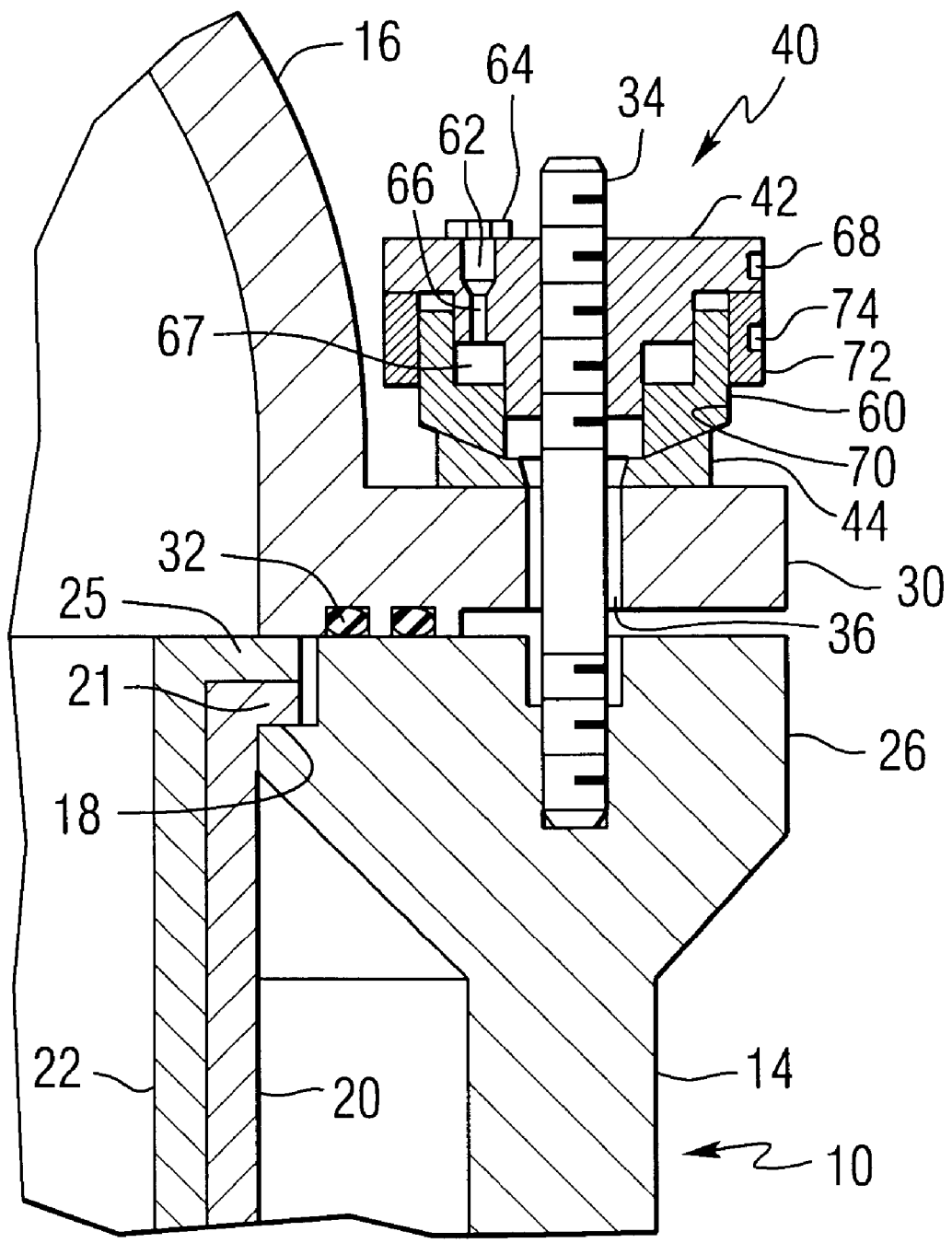
FIG. 4 is an illustration of a portion of the pressure vessel and the hydraulic nut assembly of FIG. 3 after the closure stud has been elongated and the hydraulic nut assembly has been locked in place over the closure head.

As is shown in FIG. 1, the removable closure head 16 is fastened to the pressure vessel body 14 by a plurality of hydraulic nut assemblies 40 in a preferred practice of the present invention. A hydraulic nut assembly is a fastener having a hydraulic chamber defined by two members in sliding contact with each other such that one of the members may move relative to the other member as hydraulic fluid enters or exits the chamber. Thus, each assembly 40 shown in FIG. 1 has a first member such as a transition nut 42 attached to the threaded upper portion of a closure stud 34 (as shown in FIGS. 2–4). Washers 44 may be disposed between the hydraulic nut assemblies 40 and the upper surface of the closure head flange 30. The threaded members of the hydraulic nut assemblies 40 may have a manganese phosphate coating or a plasma or ion bonded plating to resist galling. In plants having so-called "quick acting" closure studs with buttress type splines (not shown) rather than upper threaded portions, the first members must be particularly designed to attach to the configuration of the upper portion.

The hydraulic nut assemblies 40 are connected by hydraulic hoses 50, 51 and by hose connectors 52 (preferably located away from the closure head flange 30) to a source of hydraulic pressure 54, such as an electric or pneumatic pumping unit. The outside surfaces of the hoses 50 preferably are smooth in order to minimize radioactive contamination. Any suitable arrangement of hydraulic hoses 50, 51 may be employed in addition to the arrangement shown in FIG. 1. Preferably, the total length of hoses 50, 51 is minimized to simplify their installation and handling. The pressure source 54 should be sufficient to provide hydraulic fluid at pressures of at least about 10,000 psi or higher. Electric units preferably can be connected with a plant's electrical system, which may be about 440 volts. Pneumatic units preferably can be connected with a plant's air system, which may be about 100 psi. Preferably, the capacity of a pumping unit can vary between an initial high volume/low pressure mode and a second low volume/high pressure mode as the hydraulic nut assemblies 40 are pressurized. In addition, such pumping units preferably have control systems for maintaining the desired hydraulic pressure and relief valves to provide overpressure protection.

FIGS. 2–4 generally show the structural members of the hydraulic nut assemblies 40 of FIG. 1 as they are tightened to close the pressure vessel 10.

FIG. 2 shows a hydraulic nut assembly 40 attached to a closure stud 34 extending upwardly from the pressure vessel body flange 26 through the closure head flange 30 before the application of significant hydraulic pressure. Thus, the closure head 16 is floating on the spring supported upper core support assembly 22 and the closure head flange 30 is in spaced relationship from the pressure vessel body flange 26. The spacing between the flanges 30 and 26 in the region around the O-rings 20 may be on the order of about quarter of an inch. In addition, the upper core support assembly flange 25 may rest on springs (not shown).

The hydraulic nut assembly 40 has a first member such as a transition nut member 42 that is threadedly or otherwise attached to a closure stud 34 and slidingly engaged with a housing member 60. The transition nut member 42 has a small port 62 with a hydraulic fitting 64 for receiving one of the hydraulic hoses 50 shown in FIG. 1 Commercial transition nuts may have two or more fittings for connecting with a plurality of hoses 50. A small diameter passageway 66 extends from the port 62 through the transition nut member 42 to a hydraulic chamber 67 defined by the transition nut member 42 and the housing member 60. The transition nut member 42 may have one or more peripheral recesses 68 (or flats) for receiving a bar, wrench or other tool (not shown) for readily advancing the transition nut member 42 over the threads of the closure stud 34.

The housing member 60 has a bottom surface seated on the washer 44. The washer may have a concave or a flat interface with the housing member 60 and may have a flat interface with the closure head flange 30.

The housing member 60 has a threaded peripheral surface 70 engaged with a threaded locking ring member 72. The locking ring member 72 may have one or more peripheral recesses 74 (or flat regions) for receiving a bar, wrench or other tool (not shown) for readily advancing the locking ring member 72 over the threaded peripheral surface 70. At the stage shown in FIG. 2, the locking ring member 72 is merely carried by housing member 60.

To reach the stage shown in FIG. 2, the transition nuts 42 may be attached to the closure studs 34 and hand tightened against the housing members 60. Also, the hoses 50 and 51 then may be attached to the fittings 64 and to the pressure source 54. As is shown in FIG. 2, the closure head flange 30 will be spaced from the pressure vessel body flange 26 in the region of the O-rings 32 at this time.

As the pressure source 54 increases the hydraulic pressure in the chambers 67, the transition nut members 42 and closure studs 34 remain in place relative to the pressure vessel flange 26 and the housing members 60 (then acting as piston members) force the closure head 16 downwardly against the resistance of the springs 24 until the closure head flange 30 seats on the pressure body flange 26. As the hydraulic pressure continues to increase, the transition nut members 42 (then acting as piston members) begin to move upwardly and elongate the closure studs 34. FIG. 3 shows a hydraulic nut assembly 40 at a stage where the transition nut 42 has moved upwardly away from the housing member 60 and the closure stud 34 has elongated.

After the pressure source 54 has generated a predetermined pressure in the hydraulic system, the closure studs 34 will have elongated to their desired length. The locking ring members 72 may then be threaded upwardly into engagement with the transition nut members 42 as is shown in FIG. 4 to lock or brace the hydraulic nut assemblies 40 in place relative to the pressure vessel body flange 26. Once the hydraulic nut assemblies 40 are locked in place, the hydraulic pressure may be released and the hose 51 disconnected from the pressure source 54. The total movement of the hydraulic nut assemblies 40 may be less than about an inch.

Figure 5:
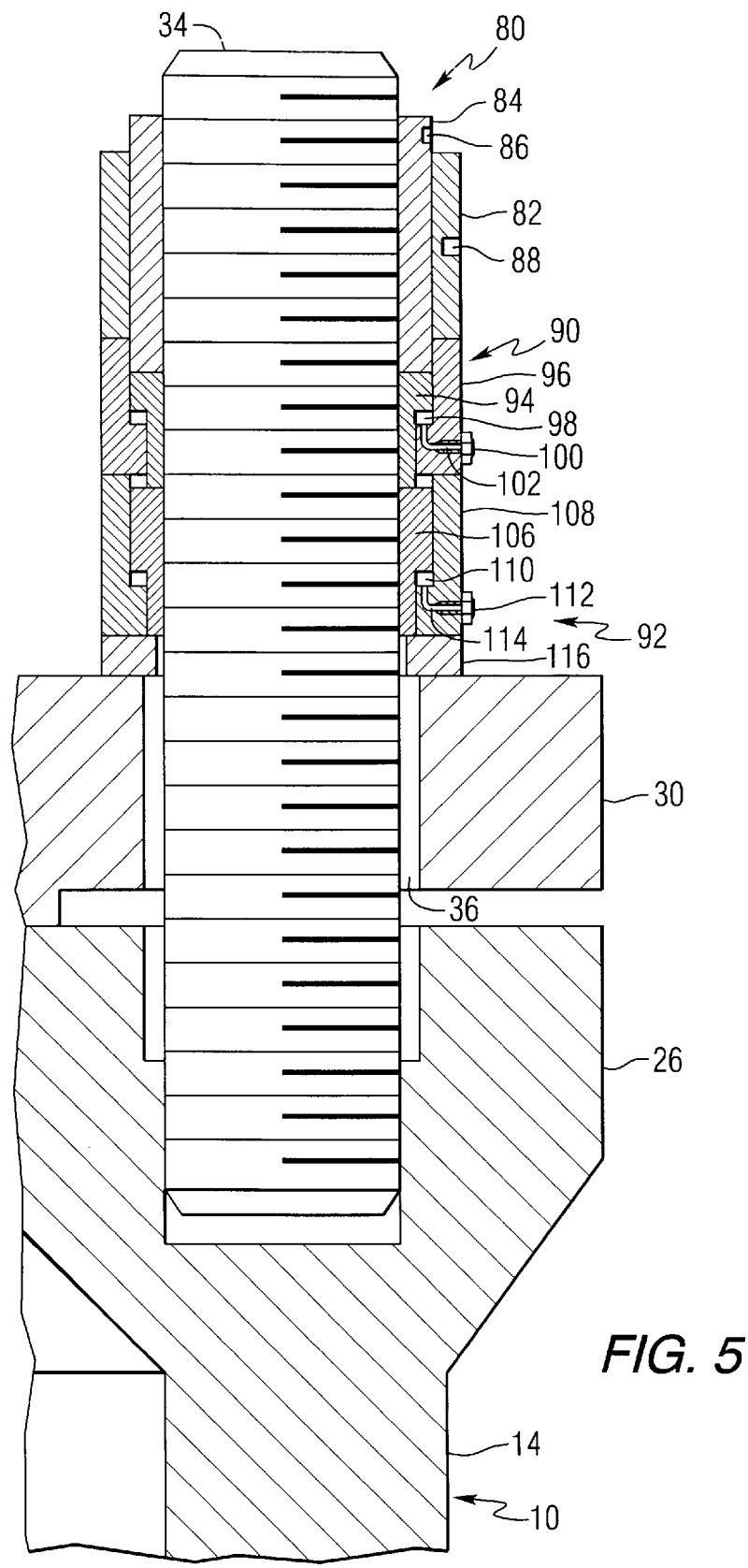
FIG. 5 is an illustration of a portion of the pressure vessel of FIG. 1 together with another hydraulic nut assembly design that may be used in the practice of the present invention.

FIG. 5 generally shows a more robust hydraulic nut assembly 80 for generating hydraulic pressures of up to about 38,000 psi or more. The hydraulic nut assembly 80 of FIG. 5 has a locking ring member 82 that is threadedly attached to a transition nut member 84. The transition nut member 84 may be threadedly or otherwise attached to a closure stud 34 having a threaded upper portion (as shown in FIG. 5) or a splined closure stud 34 (not shown). The transition nut member 84 may have peripheral recesses or flats 86 for receiving a tool (not shown) for readily advancing the transition nut member 84 over the upper portion of the closure stud 34. The locking ring member 82 also may have peripheral recesses or flats 88 for readily advancing the locking ring member 82 on the threaded peripheral surface of the transition nut member 84.

A pressure source, such as the pressure source 54 shown in FIG. 1, may apply a force (or load) to a two-stage load cell assembly, generally including an upper ram assembly 90 and a lower ram assembly 92. The upper ram assembly 90 includes an upper ram member 94 and an upper housing member 96, which define an upper chamber 98. The upper housing member has a fitting 100 for receiving a hydraulic hose 50 shown in FIG. 1 and a small hydraulic hole 102 extending from the fitting 100 to the upper chamber 98. Similarly, the lower ram assembly 92 has a lower ram member 106 and a lower housing member 108, which define a lower chamber 110. The lower housing member 108 has a fitting 112 for receiving a hydraulic hose 50 and a small diameter hydraulic hole 114 extending from the fitting 112 to the lower chamber 110. The lower housing member 108 may be supported by a washer 116.

As the pressure source 54 shown in FIG. 1 increases the hydraulic pressure in the upper chamber 98 and the lower chamber 110, the closure head flange 30 is forced downwardly against the resistance of the springs 24 and seats on the pressure vessel body flange 26. As the pressure continues to increase, the transition nut 84 is forced upwardly and the closure stud 34 elongates. After the hydraulic pressure has reached a predetermined limit, the locking ring member 82 is threaded downwardly until it is braced or locked against the top of the upper housing member 96. The total vertical movement of the hydraulic nut assembly 80 may be less than about one inch. The hydraulic pressure may then be released and the hose 51 shown in FIG. 1 disconnected from the pressure source 54.

The hydraulic nut assembly designs shown by FIGS. 2–5 and other designs and their structural members are disclosed in detail by U.S. Pat. Nos. 5,046,906; 5,527,015 and 5,730,569 and by PCT Published Patent Applications WO 98/00660 and WO 00/51791, which are incorporated by reference for their descriptions of the structures and applications of hydraulic nut assemblies. Such hydraulic nut assemblies previously have been used or have been proposed for use on hydrocracker manways in petrochemical plants, reactor coolant pump housings in light water reactors and turbine housings in power plants.

In the preferred practice of the present invention described below, the pressure vessel 10 is closed so that the plant can return to on-line electrical power generation operations after the various inspection, servicing and/or refueling steps have been completed and (if necessary) the upper core support assembly 22 has been placed over the fuel assemblies 12.

The pressure vessel 10 is closed by placing the closure head 16 over and spaced from the pressure vessel body flange 26. The pressure vessel closure head 16 may be transferred by the plant's polar crane from a nearby storage stand back to the pressure vessel body 14 and placed on the upper core support assembly 22. The closure head 16 floats (i.e., is supported) on the upper core support assembly 22 that is spring supported by the fuel assemblies 12, which maintains the flanges 30 and 26 in spaced relationship.

The hydraulic nut assemblies 40, 80 are attached to the closure studs 34. If the closure studs 34 have threaded upper portions as is shown by FIGS. 1–5, the hydraulic nut assemblies are threadedly attached to the closure studs 34. If the upper portions of the closure studs 34 have other designs such as the quick acting closure studs having buttress type splines, the hydraulic nut assemblies must be designed to attach to the other designs.

The closure studs 34 are installed in the stud holes of the pressure vessel body flange 26. The closure studs 34 may be installed while the closure head 16 is maintained in spaced relationship over the pressure vessel body 14. In one practice, the transition nut members 42, 84 may advantageously be first attached on the closure studs 34 before the closure studs 34 are installed in the pressure vessel body flange 26. In a preferred practice, the entire hydraulic nut assemblies 40, 80 are first installed on the closure studs 34 before they are installed in the pressure vessel body flange 26. In other practices, the closure studs 34 are not removed from the pressure vessel body 14 in the course of an outage. In these practices, the transition nut members 42, 84 of the hydraulic nut assemblies 40, 80 are attached to the closure studs 34 after the closure head 16 has been placed over and spaced from the pressure vessel body 16 with the closure studs 34 extending upwardly through the closure head holes 36.

The hydraulic hoses 50 and 51 are connected between the hydraulic nut assemblies 40, 80 and the pressure source 54 for applying hydraulic pressure on the hydraulic nut assemblies 40, 80. The pressure source 54 simultaneously pressures the hydraulic nut assemblies 40, 80 to simultaneously apply a force (or load) on the closure studs 34 sufficient to seat the spaced apart closure head flange 30 on the pressure vessel body flange 26 and to elongate the closure studs 34. Advantageously, all of the hydraulic nut assemblies 40, 80 may be uniformly tightened to generate a total load of about two million pounds (and the closure studs 34 tensioned) in one pass simultaneously in less than about an hour in an application which previously required more than two hours using multi-stud tensioners and current practices.

The hydraulic nut assemblies 40, 80 are locked or braced in place over the closure head flange 30 while the load is applied to the closure studs 34 and the closure studs 34 are elongated. The hydraulic nut assemblies 40, 80 may be locked in place by tightening the locking ring member 72 of FIGS. 2–4 against the transition nut 42 or by tightening the locking ring member 82 of FIG. 5 against the upper housing member 96.

The hydraulic pressure on the hydraulic nut assemblies 40, 80 is then released while the hydraulic nut assemblies 40, 80 are locked in place over the closure head flange 30 and the closure studs 34 are elongated. In one practice, the hoses 50 may be disconnected from the hydraulic nut assemblies 40, 80 and hose 51 may be disconnected from the pressure source 54. In another practice, the hoses 50 may be permitted to remain connected with the hydraulic nut assemblies 40, 80 after a plant has returned to on-line power generation operations and while generating thermal power in the pressure vessel 10. Thus, the hoses 50 are preferably vented at fittings to vent the hoses connected with the hydraulic nut assemblies 40, 80 while generating power so that residual hydraulic fluid in the hoses 50 may evaporate. Water is the preferred hydraulic fluid, and most preferably demineralized water containing a soluble salt such as sodium nitrite or the like for corrosion control. If the source of pressure 54 is mounted on a wheeled frame (as is shown in FIG. 1), the pressure source 54 can be readily wheeled into the reactor building and then connected with the hoses 50 still interconnected with the hydraulic nut assemblies 40 at the start of the following outage. Advantageously, the hydraulic nut assemblies 40 can be readily detensioned with less personnel radiation exposure.

While presently preferred practices of the present invention have been described and illustrated, it is to be understood that the invention may be otherwise variously embodied within the scope of the following claims of invention.

What is claimed is:

1. A method of closing a pressure vessel, comprising the steps of:
   placing a closure head having a flange over and spaced from a flange of a pressure vessel body containing a plurality of radioactive fuel assemblies;
   installing closure studs in closure stud holes of the pressure vessel body flange;
   attaching hydraulic nut assemblies to the closure studs;
   connecting hydraulic hoses between the hydraulic nut assemblies and a pressure source;
   simultaneously pressurizing the hydraulic nut assemblies from the pressure source to simultaneously apply a force to the closure studs sufficient to seat the spaced apart closure head flange on the pressure vessel body flange and to elongate the closure studs;
   locking the hydraulic nut assemblies in place over the closure head flange while the force is applied to the closure studs and the closure studs are elongated;
   releasing the hydraulic pressure on the hydraulic nut assemblies while the hydraulic nut assemblies are locked in place over the closure head flange and the closure studs are elongated; and then
   returning the pressure vessel to on-line operations with the hydraulic nut assemblies attached to the closure studs and with the closure head flange extending outwardly of the hydraulic nut assemblies.

2. The method of claim 1, wherein the pressure vessel contains a removable upper core support assembly supported by springs on the fuel assemblies and the step of placing the closure head having a flange over and spaced from the pressure vessel body flange comprises the step of: supporting the closure head over and in spaced relationship from the pressure vessel body flange on the removable upper core support assembly supported by springs on the fuel assemblies.

3. The method of claim 2, wherein the step of supporting the closure head over and spaced from the pressure vessel body flange comprises the step of: supporting the closure head flange a quarter of an inch from the pressure vessel body flange.

4. The method of claim 1, wherein the hydraulic nut assemblies have first members with threads and the step of attaching hydraulic nut assemblies to the closure studs comprises the step of: threading the first members onto the closure studs.

5. The method of claim 4, wherein the step of attaching the hydraulic nut assemblies comprises the step of: threading the first members onto the closure studs before the closure studs are installed in the pressure vessel body flange.

6. The method of claim 1, wherein the step of simultaneously pressuring the hydraulic nut assemblies to apply a force sufficient to seat the spaced apart closure head flange on the pressure vessel body flange and to elongate the closure studs comprises the step of: pressurizing all of the hydraulic nut assemblies attached to the closure studs.

7. The method of claim 6, wherein the step of simultaneously pressurizing the hydraulic nuts assemblies comprises: the step of pressurizing the hydraulic nut assemblies with water.

8. A method of closing a pressure vessel, comprising the steps of:
   placing a closure head having a flange over and spaced from a flange of the pressure vessel body by supporting the closure head on a removable upper core support assembly supported by springs on a plurality of fuel assemblies in the pressure body;
   installing closure studs in closure stud holes of the pressure vessel body flange;
   attaching hydraulic nut assemblies to the closure studs;
   connecting hydraulic hoses between the hydraulic nut assemblies and a pressure source;
   simultaneously pressurizing the hydraulic nut assemblies from the pressure source to simultaneously apply a force to the closure studs sufficient to seat the spaced apart closure head flange on the pressure vessel body flange and to elongate the closure studs;

locking the hydraulic nut assemblies in place over the closure head flange while the force is applied to the closure studs and the closure studs are elongated; and releasing the hydraulic pressure on the hydraulic nut assemblies while the hydraulic nut assemblies are locked in place over the closure head flange and the closure studs are elongated.

9. The method of claim 8, wherein the step of supporting the closure head over and spaced from the pressure vessel body flange comprises the step of: supporting the closure head flange a quarter of an inch from the pressure vessel body flange.

10. The method of claim 8, wherein the hydraulic nut assemblies have first members with threads and the step of attaching hydraulic nut assemblies to the closure studs comprises the step of: threading the first members onto the closure studs.

11. The method of claim 8, wherein the step of attaching the hydraulic nut assemblies comprises the step of: threading the first members onto the closure studs before the closure studs are installed in the pressure vessel body flange.

12. The method of claim 8, wherein the step of simultaneously pressuring the hydraulic nut assemblies to apply a force sufficient to seat the spaced apart closure head flange on the pressure vessel body flange and to elongate the closure studs comprises the step of: pressurizing all of the hydraulic nut assemblies attached to the closure studs.

13. The method of claim 12, wherein the step of simultaneously pressurizing the hydraulic nuts assemblies comprises: the step of pressurizing the hydraulic nut assemblies with water.

\* \* \* \* \*